United States Patent
Takatsugi et al.

(10) Patent No.: US 8,747,095 B2
(45) Date of Patent: Jun. 10, 2014

(54) MOLD CLAMPING MECHANISM FOR INJECTION MOLDING MACHINE

(71) Applicant: Fanuc Corporation, Yamanashi (JP)

(72) Inventors: Satoshi Takatsugi, Yamanashi (JP); Koichi Nishimura, Yamanashi (JP); Masatoshi Senga, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/780,961

(22) Filed: Feb. 28, 2013

(65) Prior Publication Data

US 2013/0259972 A1 Oct. 3, 2013

(30) Foreign Application Priority Data

Apr. 2, 2012 (JP) ................... 2012-083646

(51) Int. Cl.
 *B29C 33/30* (2006.01)
(52) U.S. Cl.
 USPC ........................................ 425/192 R; 425/195
(58) Field of Classification Search
 USPC ...................... 425/190, 192 R, 195
 See application file for complete search history.

(56) References Cited

U.S. PATENT DOCUMENTS

| | | | | |
|---|---|---|---|---|
| 4,867,666 A | * | 9/1989 | Brizio et al. | 425/190 |
| 5,350,289 A | * | 9/1994 | Martin | 425/190 |

FOREIGN PATENT DOCUMENTS

| | | |
|---|---|---|
| JP | 9-155929 A | 6/1997 |
| JP | 2005-205819 A | 8/2005 |
| JP | 2010-036348 A | 2/2010 |

* cited by examiner

*Primary Examiner* — James Mackey
(74) *Attorney, Agent, or Firm* — Lowe Hauptman & Ham, LLP

(57) ABSTRACT

In a mold clamping mechanism for an injection molding machine, a mold platen stiffness adjusting plate is attached to a mold platen (a movable platen, a fixed platen) at the mold attachment surface thereof. The mold platen stiffness adjusting plate is provided, at the mold attachment surface thereof, with elements for mold attachment that have the same shapes and are arranged on the same places as those provided on the mold platen at the mold attachment surface thereof. Accordingly, the same mold can be attached to the mold platen stiffness adjusting plate attached to the mold platen, and can also be attached to the mold platen from which the mold platen stiffness adjusting plate is detached.

5 Claims, 3 Drawing Sheets

MOLD CLAMPING MECHANISM FOR INJECTION MOLDING MACHINE

RELATED APPLICATIONS

The present application is based on, and claims priority from, Japanese Application Number 2012-083646, filed Apr. 2, 2012, the disclosure of which is hereby incorporated by reference herein in its entirety.

BACKGROUND OF THE INVENTION

1. Field of the Invention

The present invention relates to a mold clamping mechanism for an injection molding machine.

2. Description of the Related Art

An injection molding machine includes an injection apparatus and a mold clamping mechanism on a machine base. The mold clamping mechanism includes a fixed platen installed on the machine base, a plurality of tie bars fixed to an edge portion of the fixed platen, a movable platen that is movably installed along the tie bars, and a toggle mechanism that drives the movable platen. A fixed-side mold is attached to the fixed platen at a surface facing the movable platen. Further, a movable-side mold is attached to the movable platen at a surface facing the fixed platen. The mold is closed/opened by moving the movable platen toward the fixed platen (moving forward) and moving the movable platen in a direction away from the fixed platen (moving backward). A resin that is heated and melted in a heating cylinder of the injection apparatus is injected from an injection nozzle, fills a cavity space in the mold, and is cooled and solidified in the cavity space, whereby a molded article is obtained.

Japanese Patent Application Laid-Open No. 2010-36348 describes a mold clamping mechanism for an injection molding machine, in which a mold platen (a fixed platen, a movable platen) is configured by a molding die and a mold attachment die that is placed so as to be attachable to and detachable from the molding die, wherein a mold (a fixed-side mold, a movable-side mold) is attached to the mold attachment die. A mold-attachment receiving element is formed on the mold attachment surface of the mold attachment die so as to fit attachment elements of a plurality of molds having different specifications.

Japanese Patent Application Laid-Open No. 2005-205819 describes a mold clamping apparatus for an injection molding machine, in which a fixed platen is configured by a main body that supports end parts of tie bars and a mold fixing member fixed to the main body, wherein a fixed-side mold is attached to the mold fixing member. The structure of the mold clamping apparatus can achieve an increase in stiffness of the fixed platen, can suppress contact surfaces of the fixed-side mold and a movable-side mold from separating from each other at the time of mold clamping, and can achieve a reduction in weight of the fixed platen.

Further, Japanese Patent Application Laid-Open No. 09-155929 describes an injection molding machine, in which the entire mold attachment surface of each of a fixed platen and a movable platen is covered by a liner having a smooth surface, a high hardness, and a high corrosion resistance, wherein the liner is secured to each of the fixed platen and the movable platen by means of a securing tool that is configured so as not to protrude on the surface.

As described above, a mold clamping mechanism for an injection molding machine includes two mold platens, that is, a fixed platen fixed to a machine base and a movable platen that is placed so as to be movable and parallel to the fixed platen. A fixed-side mold is attached to the fixed platen, a movable-side mold is attached to the movable platen, and the mold is closed/opened and clamped by moving the movable platen forward/backward with respect to the fixed platen.

If the stiffness of the mold platen (the fixed platen, the movable platen) is low, the mold (the fixed-side mold, the movable-side mold) deforms together with the mold platen under the application of mold clamping power or injection pressure, so that the precision of a molded article may decrease in some cases. The required stiffness of a mold platen is determined depending on the used mold. In general, mold platens need to have a stiffness high enough to support even a mold that requires stiffness, and hence mold platens are provided with an excessive stiffness in some cases. If a mold platen is made thicker in order to enhance the stiffness of the mold platen, the total machine length is larger, costs are higher, and a space to be secured for machine installation is larger.

According to the technique described in Japanese Patent Application Laid-Open No. 2010-36348 mentioned above, the mold attachment die is added to the molding die in order to increase the degree of freedom in mold selection, and it is not assumed that the mold is attached to the molding die in the state where the mold attachment die is detached from the molding die. Further, this technique does not have an object to adjust the stiffness of the mold platen.

Further, the technique described in Japanese Patent Application Laid-Open No. 09-155929 mentioned above is intended to protect the mold surface, and does not have an object to adjust the stiffness of the mold platen.

SUMMARY OF THE INVENTION

In view of the above, the present invention has an object to provide a mold clamping mechanism for an injection molding machine that can adjust the stiffness of a mold platen and can allow the thickness of a mountable mold to be expanded without increasing the total length of the injection molding machine, with making the mold platen thinner.

A mold clamping mechanism for an injection molding machine according to the present invention performs closing/opening and clamping of a mold attached to a mold platen, wherein a mold platen stiffness adjusting plate is detachably attached to the mold platen at a mold attachment surface thereof, and the mold platen stiffness adjusting plate is provided, at the mold attachment surface thereof, with elements for mold attachment that have the same shapes and are arranged on the same places as elements for mold attachment provided on the mold platen at the mold attachment surface thereof.

The mold platen stiffness adjusting plate can be made of the same material as that of the mold platen or a material having a higher Young's modulus than that of the mold platen.

A positioning element can be additionally provided between the mold platen and the mold platen stiffness adjusting plate.

The mold platen and the mold platen stiffness adjusting plate can each include a tilt adjusting mechanism that adjusts a tilt of the mold attachment surface.

The mold platen and the mold platen stiffness adjusting plate can each include a flow path for temperature adjustment.

According to the present invention, it is possible to provide a mold clamping mechanism for an injection molding machine that can adjust the stiffness of a mold platen and can allow the thickness of a mountable mold to be expanded without increasing the total length of the injection molding machine, with making the mold platen thinner.

BRIEF DESCRIPTION OF THE DRAWINGS

The above-mentioned and other objects and features of the present invention will become apparent from the following embodiments described with reference to the attached drawings. In the attached drawings.

DETAILED DESCRIPTION OF THE PREFERRED EMBODIMENTS

Figure 1:
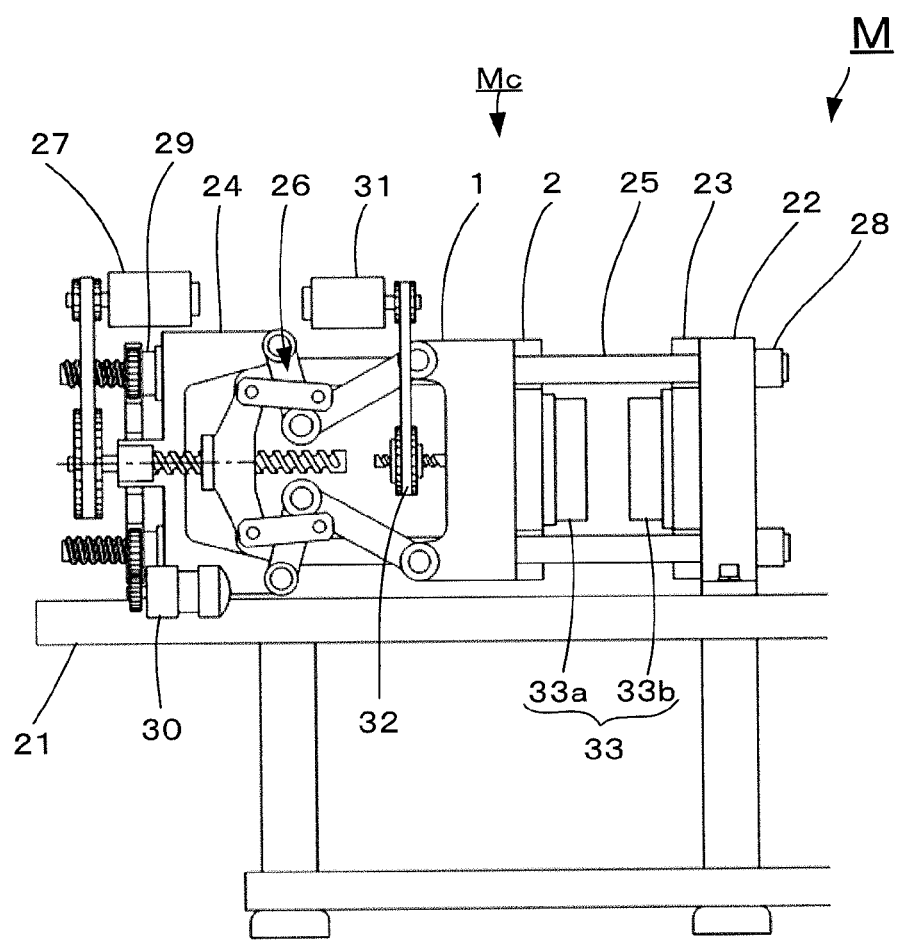
FIG. 1 is a view for describing an embodiment of a mold clamping mechanism for an injection molding machine according to the present invention.

An embodiment of a mold clamping mechanism for an injection molding machine according to the present invention is described with reference to FIG. 1.

A mold clamping mechanism Mc for an injection molding machine M includes a fixed platen 22 fixed on a machine base 21, a rear platen 24 that is movably provided at a distance from the fixed platen 22, a plurality of tie bars 25 that couple the fixed platen 22 to the rear platen 24, a movable platen 1 that is provided so as to be movable in the axial direction of the tie bars 25, a toggle-link mechanism 26 that drives the movable platen 1 in a mold closing/opening direction, and a servomotor 27 that drives the toggle-link mechanism 26. The mold clamping mechanism Mc performs closing/opening and clamping of a movable-side mold 33a attached to the movable platen 1 with respect to a fixed-side mold 33b attached to the fixed platen 22.

A male screw is formed in a portion at one end part of each tie bar 25, the portion passing through an insertion hole of the fixed platen 22. A nut is engaged with the male screw, whereby the end part of the tie bar is fixed to the fixed platen 22. Meanwhile, a trapezoidal screw is formed in a portion at another end part of each tie bar 25, the portion passing through an insertion hole of the rear platen 24. A mold thickness adjusting nut 29 is engaged with the trapezoidal screw, and the mold thickness adjusting nut 29 is rotationally driven by a mold thickness adjusting motor 30, whereby the position of the rear platen 24 is adjusted in accordance with the thickness of the mold within a range of the trapezoidal screw.

The movable platen 1 is provided with a molded-article extruding mechanism 32. A ball screw of the molded-article extruding mechanism 32 is driven by a servomotor 31, and molded-article extruding pins (not illustrated) are thus moved forward/backward, whereby a molded article is extruded.

A mold platen stiffness adjusting plate 2 is attached to the movable platen 1, and a mold platen stiffness adjusting plate 23 is attached to the fixed platen 22. Each of the movable platen 1 and the mold platen stiffness adjusting plate 2 attached to the movable platen 1 is provided, at 'the same positions' in the movable-side mold attachment surfaces thereof, with grooves for mold attachment, such as threaded holes and T-slots, having the same shapes. Similarly, each of the fixed platen 22 and the mold platen stiffness adjusting plate 23 attached to the fixed platen 22 is provided with grooves for mold attachment, such as threaded holes and T-slots, having the same shapes, at 'the same positions' in the fixed-side mold attachment surface thereof. With such a configuration, whether the mold platen stiffness adjusting plates 2 and 23 are respectively attached to the movable platen 1 and the fixed platen 22 or are respectively detached from the movable platen 1 and the fixed platen 22, the same movable-side mold 33a and the same fixed-side mold 33b can be used. "The same positions" here refer to the following state. That is, when the mold platen stiffness adjusting plates 2 and 23 are respectively attached to the movable platen 1 and the fixed platen 22, elements for mold attachment (such as the threaded holes and the T-slots) that are provided in the mold platen stiffness adjusting plates 2 and 23 are projected in a direction orthogonal to the movable-side mold attachment surface of the movable platen 1 and the fixed-side mold attachment surface of the fixed platen 22, and the vertical and horizontal positions of the projected images coincide with each other.

The mold platen stiffness adjusting plates 2 and 23 are made of the same material (for example, spheroidal graphite cast iron) as those of the movable platen 1 and the fixed platen 22 or a material (for example, carbon steel such as S45C) having a higher Young's modulus than those of the movable platen 1 and the fixed platen 22. The thicknesses of the mold platen stiffness adjusting plates 2 and 23 can be selected from several values depending on a required stiffness.

An example of the movable platen constituting the mold clamping mechanism for the injection molding machine according to the present invention is described with reference to FIG. 2.

The movable platen 1 is provided with mold attaching threaded holes 5 that are threaded holes for attachment of the movable-side mold 33a, threaded holes 3 for fixation of the mold platen stiffness adjusting plate, and holes 6 through which the molded-article extruding pins pass. Meanwhile, the mold platen stiffness adjusting plate 2 attached to the movable platen 1 is provided with mold attaching threaded holes 5 that are threaded holes for attachment of the movable-side mold 33a, counterbored holes 4 for attaching bolts, and holes 6 through which the molded-article extruding pins pass respectively. Each of the movable platen 1 and the mold platen stiffness adjusting plate 2 attached to the movable platen 1 is provided, at the same positions, with the mold attaching threaded holes 5 for attachment of the movable-side mold 33a that have the same size. Accordingly, the same movable-side mold 33a can be attached to the mold platen stiffness adjusting plate 2 attached to the movable platen 1, and can also be attached directly to the mold attachment surface of the movable platen 1 to which the mold platen stiffness adjusting plate 2 is not attached.

Figure 2:
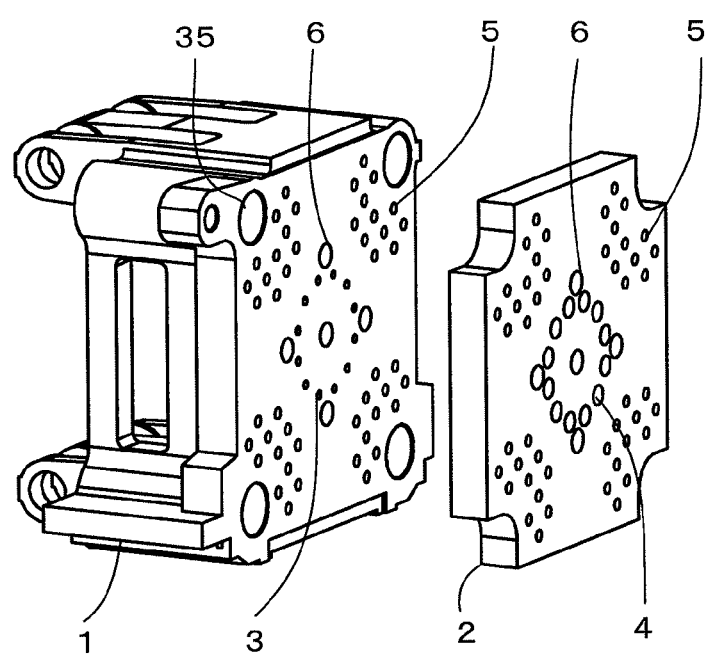
FIG. 2 is a view illustrating an example of a movable platen constituting the mold clamping mechanism for the injection molding machine according to the present invention.

The threaded holes 3 for attachment of the mold platen stiffness adjusting plate 2 to the movable platen 1 are formed in the movable platen 1 at positions that do not overlap with the mold attaching threaded holes 5 for attachment of the movable-side mold 33a (for example, near the center of the movable platen 1 as illustrated in FIG. 2). Then, the attaching bolts are respectively inserted into the counterbored holes 4 formed in the mold platen stiffness adjusting plate 2, and the leading ends of the attaching bolts are respectively screwed into the threaded holes 3 formed in the movable platen 1. Thus, the mold platen stiffness adjusting plate 2 is fixed to the movable platen 1.

Figure 3:
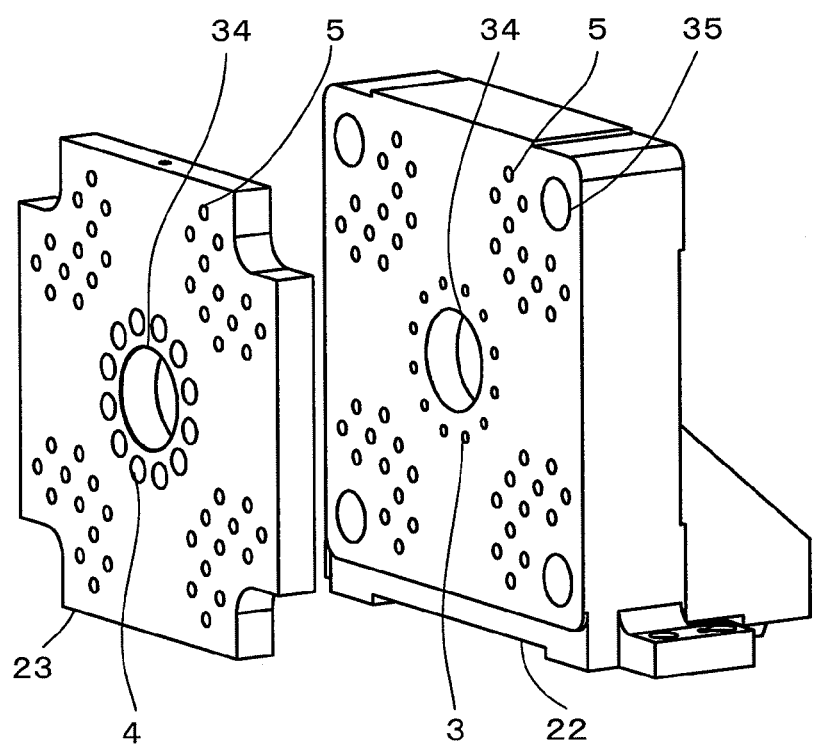
FIG. 3 is a view illustrating an example of a fixed platen constituting the mold clamping mechanism for the injection molding machine according to the present invention.

Next, an example of the fixed platen constituting the mold clamping mechanism for the injection molding machine according to the present invention is described with reference to FIG. 3.

The fixed platen 22 is provided with mold attaching threaded holes 5 that are threaded holes for attachment of the fixed-side mold 33b, threaded holes 3 for fixation of the mold platen stiffness adjusting plate, and a locating hole 34 for alignment of the fixed-side mold 33b. Meanwhile, the mold platen stiffness adjusting plate 23 attached to the fixed platen 22 is provided with mold attaching threaded holes 5 that are threaded holes for attachment of the fixed-side mold 33b, counterbored holes 4 for attaching bolts, and a locating hole 34. Each of the fixed platen 22 and the mold platen stiffness adjusting plate 23 attached to the fixed platen 22 is provided, at the same positions, with the mold attaching threaded holes 5 for attachment of the fixed-side mold 33b that have the same size. Accordingly, the same fixed-side mold 33b can be attached to the mold platen stiffness adjusting plate 23 attached to the fixed platen 22, and can also be attached directly to the mold attachment surface of the fixed platen 22 to which the mold platen stiffness adjusting plate 23 is not attached.

The attaching bolts are respectively inserted into the counterbored holes 4 formed in the mold platen stiffness adjusting plate 23, and the leading ends of the attaching bolts are respectively screwed into the threaded holes 3 of the fixed platen 22, the threaded holes 3 being formed at positions that do not overlap with the mold attaching threaded holes 5 for attachment of the fixed-side mold 33b. Thus, the mold platen stiffness adjusting plate 23 is fixed to the fixed platen 22.

Figure 4:
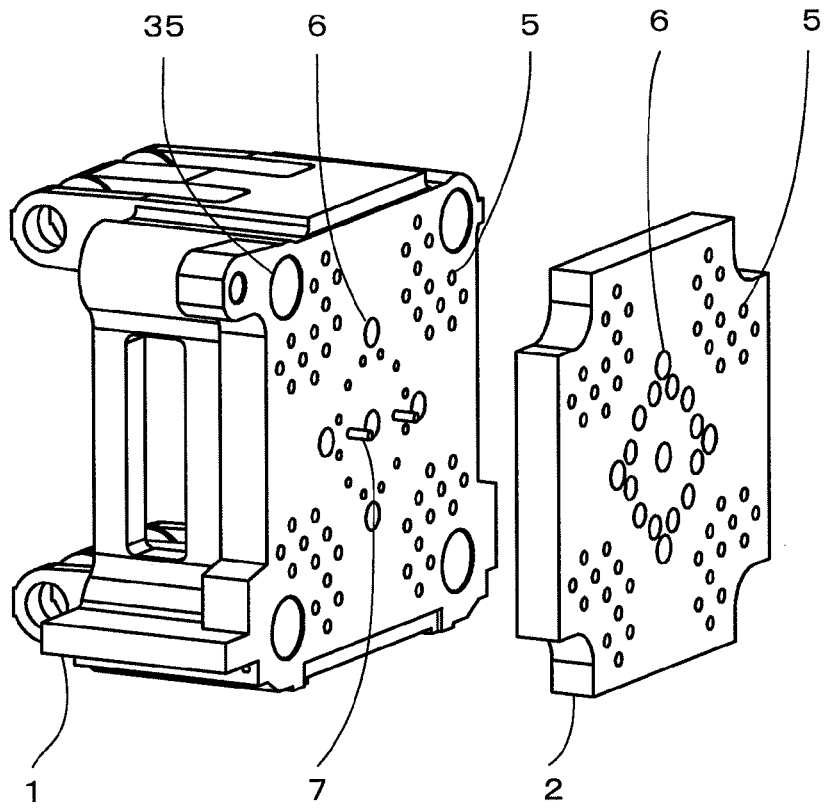
FIG. 4 is a view illustrating a modified example of the movable platen illustrated in FIG. 2.

A modified example of the movable platen illustrated in FIG. 2 is described with reference to FIG. 4. In the modified example, a positioning element is added to the movable platen.

Pin holes for positioning are formed in the movable platen 1, and pin holes are formed in the mold platen stiffness adjusting plate 2 attached to the movable platen 1 at the surface abutting against the movable platen 1. Then, parallel pins 7 are fitted into the pin holes of the movable platen 1 and the pin holes of the mold platen stiffness adjusting plate 2, whereby the mold platen stiffness adjusting plate 2 is positioned with respect to the movable platen 1. In this way, displacement of threaded hole positions caused by displacement of the mold platen stiffness adjusting plate 2 from the movable platen 1 can be prevented.

Similarly, (although not illustrated), pin holes for positioning are formed in the fixed platen 22, and pin holes are formed in the mold platen stiffness adjusting plate 23 attached to the fixed platen 22 at the surface abutting against the fixed platen 22. Then, parallel pins 7 are fitted into the pin holes of the fixed platen 22 and the pin holes of the mold platen stiffness adjusting plate 23, whereby the mold platen stiffness adjusting plate 23 can be positioned with respect to the fixed platen 22.

Figure 5:
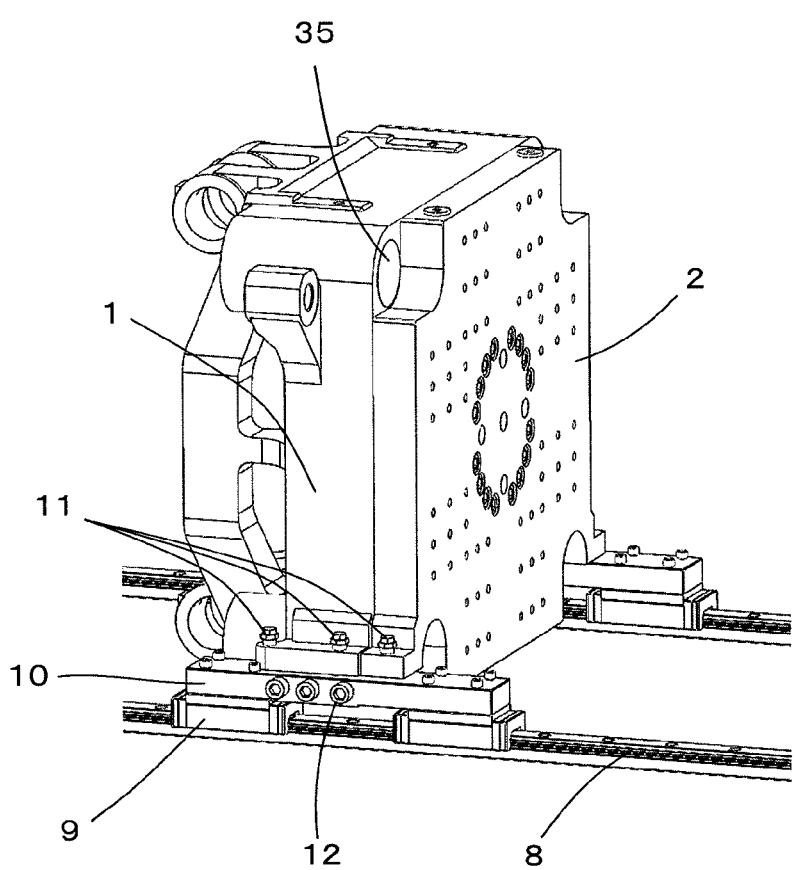
FIG. 5 is a view for describing another embodiment of the mold clamping mechanism for the injection molding machine according to the present invention.

Another embodiment of the mold clamping mechanism for the injection molding machine according to the present invention is described with reference to FIG. 5. A mold clamping mechanism of the another embodiment is provided with a mechanism that adjusts the tilt of each mold attachment surface.

The movable platen 1 is supported by a linear guide including linear guide rails 8 and linear guide bearings 9. A block 10 is fixed to the linear guide bearings 9. Fixing bolts 12 respectively pass through through-holes of the block 10, and male screw parts at the leading ends of the fixing bolts 12 are respectively engaged with female screw parts of the movable platen 1.

A clearance between the fixing bolts 12 and the through-holes of the block 10 is equal to or more than 1 mm. In the state where the fixing bolts 12 are loosened, a vertical gap between the block 10 and the movable platen 1 is adjusted by turning jack-up bolts 11 provided at two positions on each side, whereby the tilt of the movable platen 1 can be adjusted. After the adjustment, the fixing bolts 12 are fastened, whereby the block 10 and the movable platen 1 are fixed to each other. When the mold platen stiffness adjusting plate 2 is attached to the movable platen 1, the center of gravity of the movable platen 1 shifts toward the fixed platen 22 due to with the weight of the mold platen stiffness adjusting plate 2, and the movable platen 1 falls more easily toward the fixed platen 22. Hence, a jack-up bolt 11 is attached also to the mold platen stiffness adjusting plate 2, whereby the span between the jack-up bolts 11 is made larger, thus achieving easier adjustment. Note that the movable platen 1 may be supported by a slide plate instead of the linear guide (the linear guide rails 8 and the linear guide bearings 9) in FIG. 5.

Figure 6:
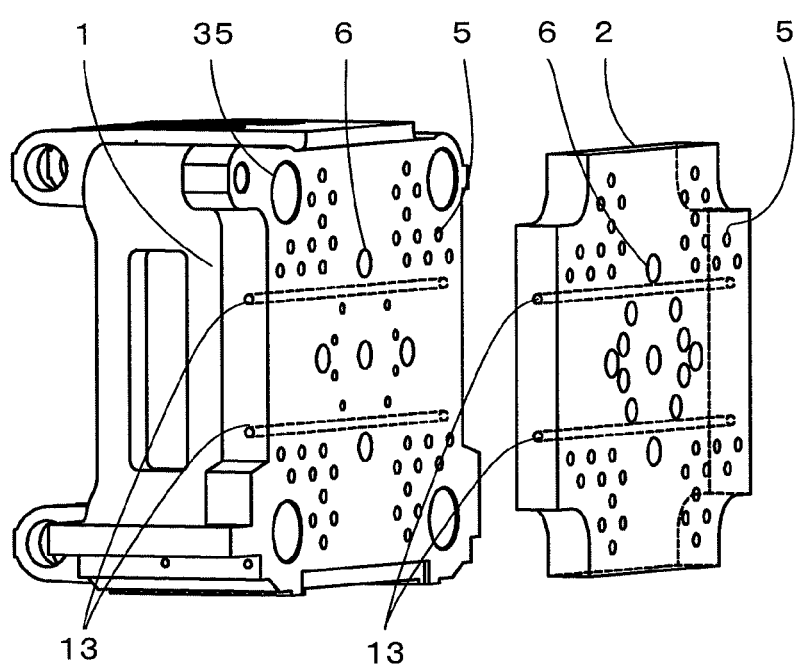
FIG. 6 is a view for describing still another embodiment of the mold clamping mechanism for the injection molding machine according to the present invention.

Still another embodiment of the mold clamping mechanism for the injection molding machine according to the present invention is described with reference to FIG. 6, in which the mold clamping mechanism of this embodiment includes a flow path for temperature adjustment.

Pipes 13 for temperature adjustment that are flow paths for circulation of a medium for temperature adjustment are placed in each of the movable platen 1 and the mold platen stiffness adjusting plate 2 at the same positions. Then, when the mold platen stiffness adjusting plate 2 is attached to the movable platen 1, the medium for temperature adjustment is circulated through the pipes 13 for temperature adjustment of the mold platen stiffness adjusting plate 2. On the other hand, when the mold platen stiffness adjusting plate 2 is detached from the movable platen 1, the medium for temperature adjustment is circulated through the pipes 13 for temperature adjustment of the movable platen 1. In this way, whether the mold platen stiffness adjusting plate 2 is attached to or detached from the movable platen 1, the temperature distribution of the mold attachment surface can be kept constant.

Similarly, (although not illustrated), pipes for temperature adjustment that are flow paths for circulation of a medium for temperature adjustment are placed in each of the fixed platen and the mold platen stiffness adjusting plate at the same positions. Consequently, when the mold platen stiffness adjusting plate is attached to the fixed platen, the medium for temperature adjustment can be circulated through the pipes for temperature adjustment of the mold platen stiffness adjusting plate. On the other hand, when the mold platen stiffness adjusting plate is detached from the fixed platen, the medium for temperature adjustment can be circulated through the pipes for temperature adjustment of the fixed platen.

As described above, in the mold clamping mechanism for the injection molding machine according to the present invention, the mold platen stiffness adjusting plate 2, 23 for enhancement of the stiffness of the mold platen (the movable platen 1, the fixed platen 22) is attached to the mold attachment surface of the mold platen (the movable platen 1, the fixed platen 22). Accordingly, the mold clamping mechanism for the injection molding machine can allow the thickness of a mountable mold 33 (the movable-side mold 33a, the fixed-side mold 33b) to be expanded without increasing the total machine length, with making the mold platen (the movable platen 1, the fixed platen 22) thinner.

The horizontal and vertical sizes of the mold platen stiffness adjusting plate 2, 23 are set to be equal to or more than those of the mold platen (the movable platen 1, the fixed platen 22). As for the thickness of the mold platen stiffness adjusting plate 2, 23, the thickness of the mold platen (the movable platen 1, the fixed platen 22) is first determined so as to satisfy performance in terms of general molds, and then the thickness of the combination of the mold platen (the movable platen 1, the fixed platen 22) and the mold platen stiffness adjusting plate 2, 23 is then determined so as to satisfy performance in terms of molds that require stiffness.

In the case where the used mold 33 (the movable-side mold 33*a*, the fixed-side mold 33*b*) requires the mold platen (the movable platen 1, the fixed platen 22) to have a high stiffness, the mold platen stiffness adjusting plate 2, 23 is attached to the mold platen (the movable platen 1, the fixed platen 22). On the other hand, in the case where the used mold 33 (the movable-side mold 33*a*, the fixed-side mold 33*b*) does not require the mold platen (the movable platen 1, the fixed platen 22) to have a high stiffness, the mold platen stiffness adjusting plate 2, 23 is detached from the mold platen (the movable platen 1, the fixed platen 22), whereby the mold thickness is allowed to expand and the mold 33 (the movable-side mold 33*a*, the fixed-side mold 33*b*) having a larger thickness can be attached. Each of the mold platen (the movable platen 1, the fixed platen 22) and the mold platen stiffness adjusting plate 2, 23 is provided, at the same positions in the mold attachment surfaces thereof, with the elements for mold attachment, such as the threaded holes and the T-slots, having the same sizes. As a result, the same mold 33 (the movable-side mold 33*a*, the fixed-side mold 33*b*) can be attached to the mold platen (the movable platen 1, the fixed platen 22) to which the mold platen stiffness adjusting plate 2, 23 is attached, and can also be attached to the mold platen (the movable platen 1, the fixed platen 22) from which the mold platen stiffness adjusting plate 2, 23 is detached.

What is claimed is:

1. A mold clamping mechanism for performing closing/opening and clamping of a mold attached to a mold platen in an injection molding machine, the mold clamping mechanism comprising:

a mold platen stiffness adjusting plate detachably attachable to the mold platen at a mold attachment surface of the mold platen;

wherein said mold platen stiffness adjusting plate is provided, at a mold attachment surface of said mold platen stiffness adjusting plate, with mold attachment elements that have the same shapes and are arranged on the same places as mold attachment elements provided on the mold platen at the mold attachment surface of the mold platen, when the mold platen stiffness adjusting plate is attached to the mold platen, the mold is attachable to the mold platen stiffness adjusting plate at the corresponding mold attachment elements of the mold platen stiffness adjusting plate, and when the mold platen stiffness adjusting plate is not attached to the mold platen, the mold is attachable to the mold platen at the corresponding mold attachment elements of the mold platen.

2. The mold clamping mechanism according to claim 1, wherein said mold platen stiffness adjusting plate is made of the same material as that of the mold platen or a material having a higher Young's modulus than that of the mold platen.

3. The mold clamping mechanism according to claim 1, further comprising:

a positioning element additionally provided between the mold platen and the mold platen stiffness adjusting plate.

4. A mold clamping mechanism for an injection molding machine, the mold clamping mechanism performing closing/opening and clamping of a mold attached to a mold platen, wherein a mold platen stiffness adjusting plate is detachably attached to the mold platen at a mold attachment surface thereof;

said mold platen stiffness adjusting plate is provided, at a mold attachment surface thereof, with elements for mold attachment that have the same shapes and are arranged on the same places as elements for mold attachment provided on the mold platen at the mold attachment surface thereof; and the mold platen and the mold platen stiffness adjusting plate each include a tilt adjusting mechanism that adjusts a tilt of the mold attachment surface.

5. A mold clamping mechanism for an injection molding machine, the mold clamping mechanism performing closing/opening and clamping of a mold attached to a mold platen, wherein a mold platen stiffness adjusting plate is detachably attached to the mold platen at a mold attachment surface thereof;

said mold platen stiffness adjusting plate is provided, at a mold attachment surface thereof, with elements for mold attachment that have the same shapes and are arranged on the same places as elements for mold attachment provided on the mold platen at the mold attachment surface thereof; and the mold platen and the mold platen stiffness adjusting plate each include a flow path for temperature adjustment.

* * * * *